June 18, 1963  F. S. BLACK  3,094,456
CONCENTRATED INSECTICIDAL COMPOSITIONS
Filed Jan. 17, 1961  3 Sheets-Sheet 1
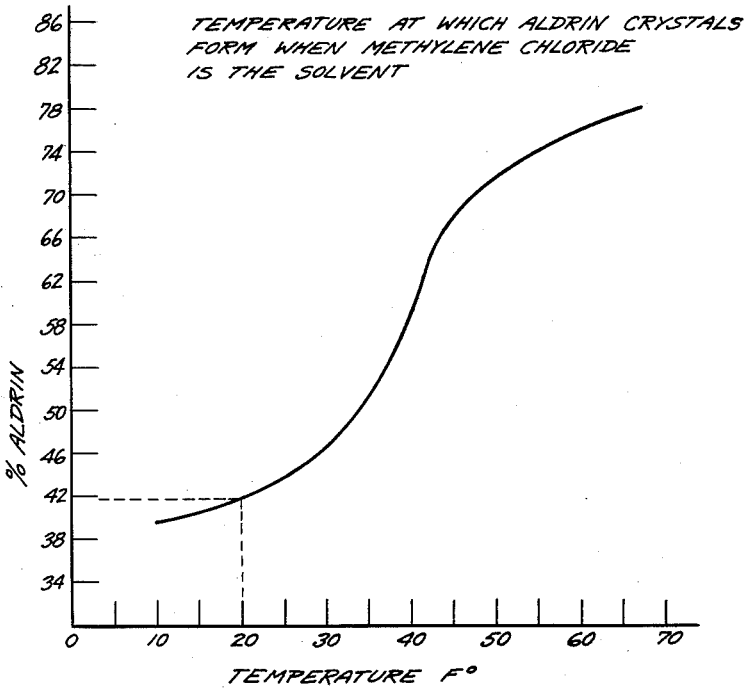
FIG. 1 — TEMPERATURE AT WHICH ALDRIN CRYSTALS FORM WHEN METHYLENE CHLORIDE IS THE SOLVENT
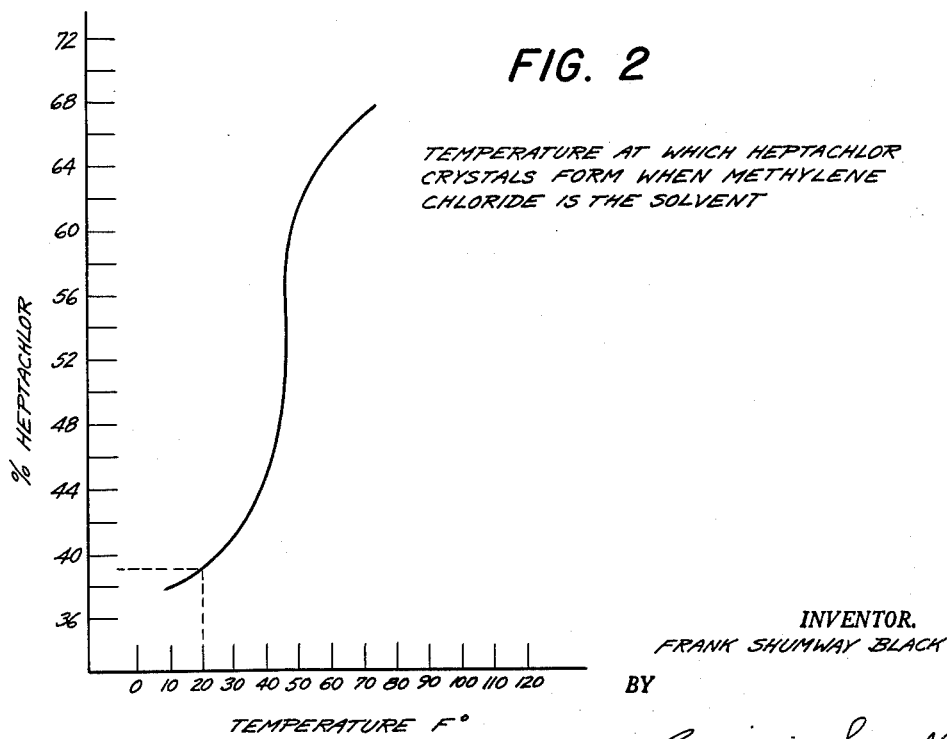
FIG. 2 — TEMPERATURE AT WHICH HEPTACHLOR CRYSTALS FORM WHEN METHYLENE CHLORIDE IS THE SOLVENT
INVENTOR.
FRANK SHUMWAY BLACK
BY
Benjamin Sweedler
ATTORNEY

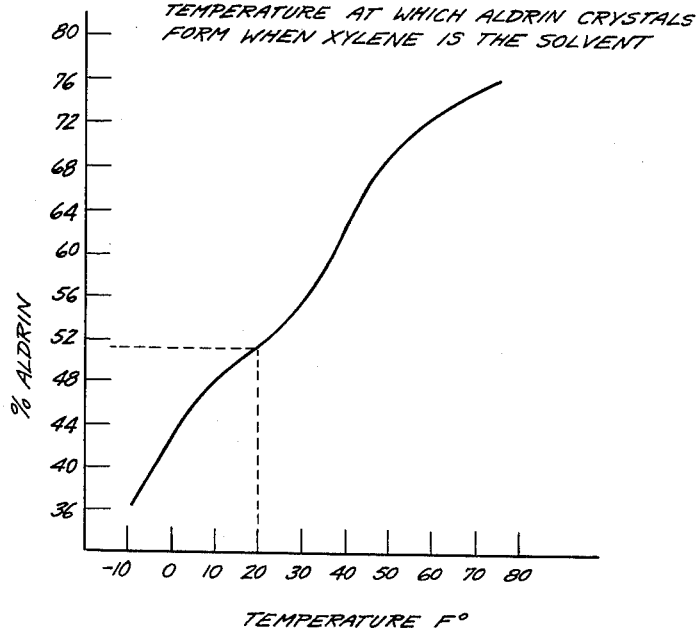
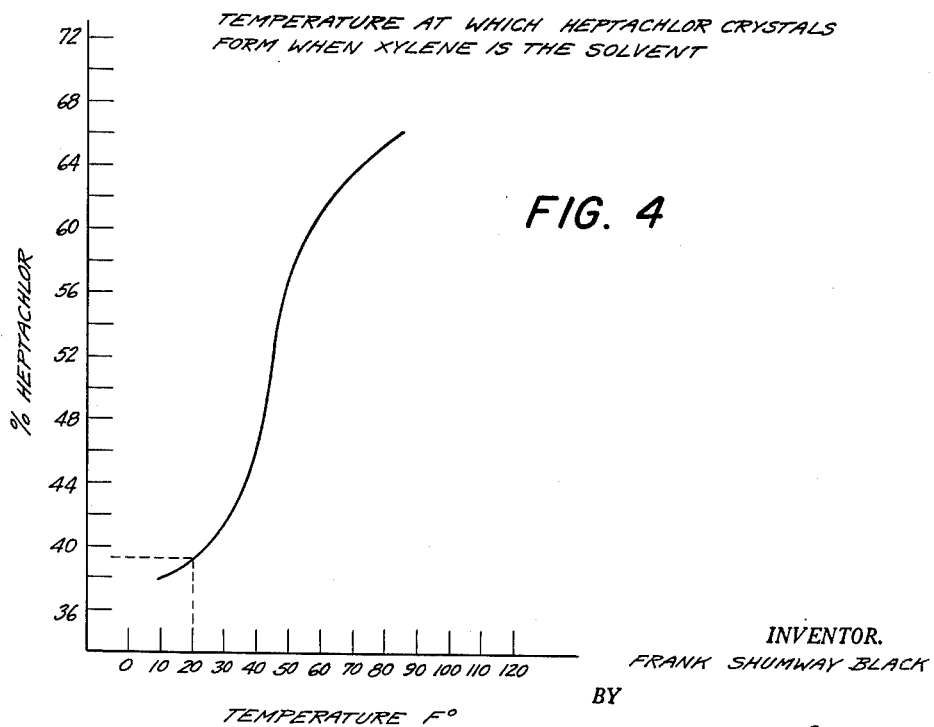

United States Patent Office 3,094,456
Patented June 18, 1963

3,094,456
CONCENTRATED INSECTICIDAL COMPOSITIONS
Frank Shumway Black, Westwood Manor, Wilmington, Del., assignor to FMC Corporation, a corporation of Delaware
Filed Jan. 17, 1961, Ser. No. 83,291
9 Claims. (Cl. 167—30)

This invention relates to novel insecticidal solutions.
In this specification, all percentages and parts are by weight.

The impregnation of solid fertilizers with solutions containing chlorinated hydrocarbon insecticides is well known. Solutions containing 1,2,3,4,10-hexachloro-1,4,4a,5,8,8a - hexhydro - 1,4-endo,exo-5,8-dimethanonaphthalene (hereinafter called aldrin) or 1,4,5,6,7,8,8-heptachlor-3a,4,7,7a-tetrahydro-4,7-methanoindene (hereinafter called heptachlor) have been used for this purpose. In the impregnation of dry fertilizers with chlorinated hydrocarbon insecticides, such as aldrin or heptachlor, a solution having a high concentration of the active ingredient is desirable so that the required amount of insecticide may be applied to the fertilizer without making it too wet or sticky. Moreover, in the storage and shipment of solutions of aldrin or of heptachlor for use in impregnating fertilizers and for other insecticidal uses, it is desirable to employ relatively concentrated solutions. By so doing, waste of solvent is minimized. Also an important economy is effected in transportation costs in that less solvent and more active material is shipped per unit weight.

It is important that the amount of solvent used is enough to give a stable solution, one from which aldrin or heptachlor, as the case may be, crystals will not form at the temperature conditions encountered in storage or shipment. As a practical matter, such solutions should be stable, i.e., discrete crystals should not form at temperatures as low as 20° F., which temperatures are frequently encountered in the storage of such solutions under winter conditions in the colder climates. It is not unusual to store and handle these solutions in unheated buildings where the temperature may fall to 20° F.

The accompanying drawings depict a series of curves showing the temperature-percentage content relation for aldrin and heptachlor, respectively, in the solvents methylene chloride, xylene and methylated naphthalenes. The particular methylated naphthalene used as the solvent is the heavy aromatic naphtha household grade sold by Standard Oil of New Jersey having the following specifications:

| | |
|---|---|
| Specific gravity, 60/60° F | 0.9224 |
| Gravity, ° API, 60° F | 21.9 |
| Lbs./gallon, 60° | 7.68 |
| Viscosity, cs. at 25° | 1.627 |
| Color, Saybolt | 16 |
| Refractive index, 20° F | 1.5059 |
| Distillation range, ° F.: | |
| IBP | 320 |
| 5% | 343 |
| 50% | 406 |
| 90% | 488 |
| 95% | 509 |
| Dry point | 532 |
| Flash point, ° F. (tag closed cup) | 141 |
| Percent aromatics | 83% min. |
| Non-volatile content, g./100 ml | 0.189 |
| Kauri-butanol value | 95.0 |

In the drawings,
FIGURE 1 is a curve showing the temperature-percentage content relation for a commercial grade of aldrin (90% active material) in methylene chloride as the solvent. It will be noted from this curve that the maximum amount of aldrin which remains in solution at 20° F. is less than about 42%; if more than 42% aldrin is present at 20° F. crystals of aldrin form.

FIGURE 2 is a curve showing the temperature-percentage content relation for a commercial grade of heptachlor (67% active material) in methylene chloride. It will be noted from this curve that the maximum amount of heptachlor which remains in solution at 20° F. is about 38%; more heptachlor, if present, will crystallize.

FIGURE 3 is a curve showing the temperature-percentage content relation for a commercial grade of aldrin (91% active material) in xylene. It will be noted from this curve that the maximum amount of aldrin which remains in solution at 20° F. is approximately 50%; more aldrin, if present, will crystallize.

FIGURE 4 is a curve showing the temperature-percentage content relation for a commercial grade of heptachlor (67% active material) in xylene. It will be noted from this curve that the maximum amount of heptachlor which remains in solution at 20° F. is about 38%; more heptachlor, if present, will crystallize.

Figure 5:
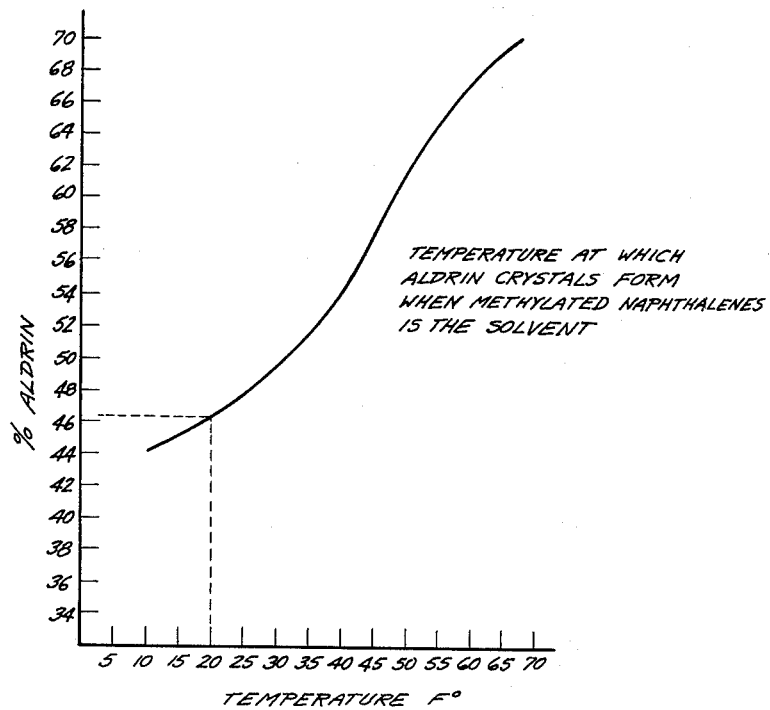
FIGURE 5 is a curve showing the temperature-percentage content relation for a commercial grade of aldrin (91% active material) in methylated naphthalene, the specification for which is given above. It will be noted from this curve that the maximum amount of aldrin which remains in solution at 20° F. is about 46%; more aldrin, if present, will crystallize.
Figure 6:
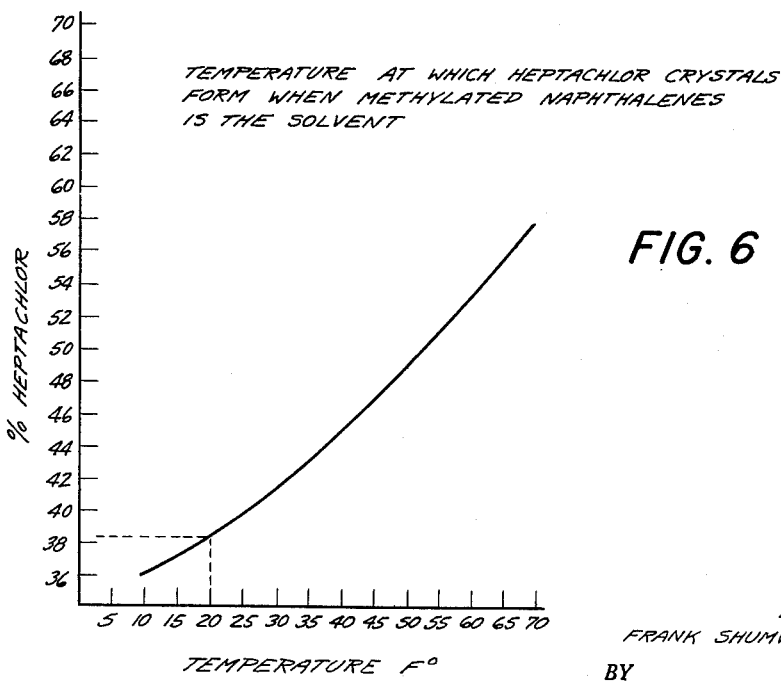
FIGURE 6 is a curve showing the temperature-percentage content relation for a commercial grade of heptachlor (67% active material) in the same methylated naphthalene. It will be noted from this curve that the maximum amount of heptachlor which remains in solution at 20° F. is about 38%; more heptachlor, if present, will crystallize.

It is among the objects of the present invention to provide a solution of aldrin and heptachlor containing at least about 53% of these active ingredients, which solution remains stable at temperatures as low as 20° F.

It is a further object of this invention to provide an insecticidal solution containing both aldrin and heptachlor, which solution is stable at temperatures as low as 20° F. and contains these active insecticidal materials in a concentration markedly greater than the solubility of either of the active materials in the same solvent at temperatures of about 20° F.

These and other objects of the invention will be apparent from the following description.

In accordance with the present invention, a single phase insecticidal solution is provided, which solution will not crystallize at temperatures as low as 20° F. and contains at least about 53% of active ingredients consisting essentially of a mixture of aldrin and heptachlor in a ratio of 3 to 1 parts of heptachlor to 1 to 3 parts of aldrin, preferably about 1 to 1 of heptachlor to aldrin, in a liquid solvent, namely, xylene, methylene chloride, methylated naphthalenes, or a mixture of these solvents. Preferably the insecticidal solution contains from 60% to 90% of a mixture of aldrin and heptachlor in the relative proportions indicated and from 10% to 40% of the solvent above mentioned. The solution may, of course, contain small amounts of other common additives, such as emulsifying agents including anionic, nonionic and mixtures of anionic and nonionic emulsifiers.

Surprisingly I have found that a mixture of aldrin and heptachlor in the ratio of 3 to 1 parts of heptachlor to 1 to 3 parts of aldrin is more soluble in the solvents mentioned at low temperatures, i.e., as low as 20° F., than either aldrin alone or heptachlor alone. While the reasons for this phenomenon are not fully known or understood, it is believed that the aldrin and heptachlor in the indicated proportions form eutectic mixtures which have better solubility characteristics in the enumerated solvents than does aldrin alone or heptachlor alone. It will be appreciated that this invention is not to be limited to the above explanation which is advanced to facilitate a better understanding of the invention.

In addition to the use of the single phase insecticidal solutions of this invention as a ready-made formulation for application to dry fertilizers, such solutions with or without an emulsifying agent may be used for insecticidal purposes to control insects such as southern army worms (*Prodenia eridania*). Dispersing and emulsifying agents which can be employed include polyoxyethylene alkylphenols, polyoxyethylene fatty esters, polyoxyethylene sorbitan fatty esters blended with oil-soluble sulfonates, for example, a mixture of the calcium salt of an oil-soluble sulfonate (Emcol H-300X) and polyoxyethylene glycol ether (Emcol H-500X).

The following examples are given for illustrative purposes. It will be understood the invention is not limited to these examples. In these examples the aldrin and heptachlor were commercial grades. The heptachlor in all examples contained 72% active material, the aldrin from 91% to 93% active material. In all cases the constituents mentioned in the proportions indicated were mixed at room temperature.

*Example I*

| | Percent |
|---|---|
| Aldrin | 32 |
| Heptachlor | 42 |
| Xylene | 21 |
| Emcol H-300X | 3.75 |
| Emcol H-500X | 1.25 |

The solution deposits no crystals at 20° F.

*Example II*

| | Percent |
|---|---|
| Aldrin | 23.05 |
| Heptachlor | 30.89 |
| Xylene | 46.06 |

The solution on standing for eleven days at −19° F. deposited no crystals. After this 11-day period, it was seeded with both heptachlor and aldrin and remained at −19° F. for an additional eight days, at the end of which time it still remained free of crystals.

*Example III*

| | Percent |
|---|---|
| Aldrin | 24 |
| Heptachlor | 31 |
| Xylene | 45 |

This solution was stable at 20° F.

*Example IV*

| | Percent |
|---|---|
| Aldrin | 31.1 |
| Heptachlor | 39.3 |
| Xylene | 29.6 |

This solution was tested at temperatures between 0° to 10° F. and showed practically no solid formation after two weeks at these temperatures. This solution showed only a negligible amount of solid formation at 0° F. after three months storage at 0° F.

*Example V*

| | Percent |
|---|---|
| Aldrin | 30.5 |
| Heptachlor | 38.5 |
| Xylene | 27 |
| Emulsifier | 4 |

This solution was stable at temperatures above 0° F. Only a negligible amount of solid or crystal formation was observed after one week of storage at 0° F.

*Example VI*

| | Percent |
|---|---|
| Aldrin | 36 |
| Heptachlor | 44 |
| Methylene chloride | 20 |

This solution was stable at 20° F.

*Example VII*

| | Percent |
|---|---|
| Aldrin | 36 |
| Heptachlor | 44 |
| Methylene chloride | 10 |
| Xylene | 10 |

This solution was stable at 20° F.

| | Examples | | | | |
|---|---|---|---|---|---|
| | VIII | IX | X | XI | XII |
| Aldrin, percent | 45 | 47 | 43 | 49 | 41 |
| Heptachlor, percent | 45 | 43 | 47 | 41 | 49 |
| Xylene, percent | 10 | 10 | 10 | 10 | 10 |

These solutions did not crystallize at 32° F. after five days at this temperature. At 10° F., after standing for five days, the entire mass solidified but without crystal formation. Upon permitting the mass to stand at about 40° F., the solidified mass again became a substantially homogeneous solution.

The above examples demonstrate the surprising increase in solubility of the mixture of aldrin and heptachlor in the ratio of 3 to 1 parts of heptachlor to 1 to 3 parts of aldrin in the enumerated solvents as compared with aldrin alone or heptachlor alone in the same solvent. Compare, for instance, Example I, which contains 32% aldrin and 42% heptachlor (a total of 74% aldrin and heptachlor) in 21% xylene solvent with FIGURES 3 and 4 which show the solubility curves for aldrin and heptachlor in xylene. It will be noted from FIGURE 4 that the maximum solubility of heptachlor in xylene at 20° F. is about 38%. Example I contains approximately 4% more heptachlor than the maximum solubility of heptachlor in xylene at 20° F. In addition, Example I contains about 32% aldrin, and yet the composition is stable at temperatures as low as 20° F. This is indeed surprising and unexpected. Equally surprising and unexpected is the stability of the solution of Example II at 20° F. taking into account the fact that as shown in FIGURE 4 heptachlor is less soluble in xylene than aldrin, yet this example contains 30.89% heptachlor and 23.05% aldrin, appreciably more total active material than the maximum amount of the more soluble aldrin which will remain in the xylene solvent without crystallization at 20° F.

It will be noted that the present invention provides a single phase insecticidal solution containing at least about 53% of active ingredients consisting essentially of a mixture of aldrin and heptachlor, which solution is stable at temperatures as low as 20° F. Moreover, this invention provides such solutions containing appreciably more of a mixture of these active ingredients as compared with the maximum solubility of either aldrin or heptachlor in these solvents at relatively low temperatures of the order of about 20° F.

The percentage solubility values given above for aldrin and heptachlor refer to the solubility of commercial grades of these materials which contain small amounts of isomers and other related materials.

It is to be understood that this invention is not restricted to the present disclosure otherwise than as defined by the appended claims.

This application is a continuation-in-part of application Serial No. 623,783, filed November 23, 1956, now abandoned.

What is claimed is:

1. A single phase insecticidal solution which will not crystallize at temperatures as low as 20° F. containing at least about 53% by weight of active ingredients consisting essentially of a mixture of aldrin and heptachlor in the ratio of 3 to 1 parts by weight of heptachlor to 1 to 3 parts by weight of aldrin in not more than about 47% by weight of a liquid solvent from the group consisting of xylene, methylene chloride, methylated naphthalene and mixtures of at least two of said solvents.

2. A single phase insecticidal solution which will not crystallize at temperatures as low as 20° F. containing at least about 53% by weight of active ingredients consisting essentially of a mixture of aldrin and heptachlor in the ratio of 3 to 1 parts by weight of heptachlor to 1 to 3 parts by weight of aldrin in not more than about 47% by weight of xylene.

3. An insecticidal solution which will not crystallize at temperatures as low as 20° F. containing at least about 53% by weight of active ingredients consisting essentially of a mixture of aldrin and heptachlor in the ratio of 3 to 1 parts by weight of heptachlor to 1 to 3 parts by weight of aldrin in not more than about 47% by weight of methylene chloride.

4. An insecticidal solution which will not crystallize at temperatures as low as 20° F. containing at least about 53% by weight of active ingredients consisting essentially of a mixture of aldrin and heptachlor in the ratio of 3 to 1 parts by weight of heptachlor to 1 to 3 parts by weight of aldrin in not more than about 47% by weight of methylated naphthalene solvent.

5. An insecticidal solution which will not crystallize at temperatures as low as 20° F. containing from about 60% to 90% by weight of active ingredients consisting essentially of a mixture of aldrin and heptachlor in approximately equal parts in from 10% to 40% by weight of a liquid solvent from the group consisting of xylene, methylene chloride, methylated naphthalene and mixtures of at least two of said solvents.

6. An insecticidal solution which will not crystallize at temperatures as low as 20° F. containing about 32% by weight of aldrin, about 42% by weight of heptachlor and about 21% by weight of xylene.

7. An insecticidal solution which will not crystallize at temperatures as low as 20° F. containing about 23% by weight of aldrin, about 31% by weight of heptachlor and about 46% by weight of xylene.

8. An insecticidal solution which will not crystallize at temperatures as low as 20° F. containing about 24% by weight of aldrin, about 31% by weight of heptachlor and about 45% by weight of xylene.

9. An insecticidal solution which will not crystallize at temperatures as low as 20° F. containing about 30.5% by weight of aldrin, about 38.5% by weight of heptachlor, about 27% by weight of xylene and about 4% by weight of an emulsifying agent.

References Cited in the file of this patent

Handbook of Aldrin, Dieldrin and Endrin Formulations—Shell Chemical Corporation, December 1954, pages 6, 7, 9, 10 and 11. (Copy in Patent Office Scientific Library.)